Sept. 29, 1970     T. R. CALLAHAN     3,531,216
SHAFT ATTACHING MEANS FOR PUMP IMPELLER
Filed Dec. 23, 1968
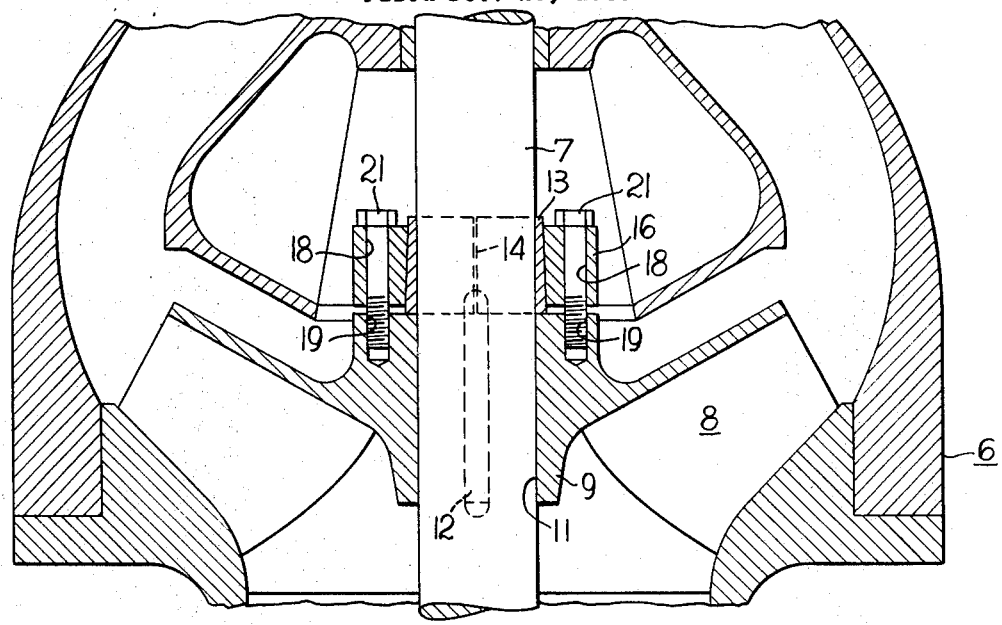
Fig. 1
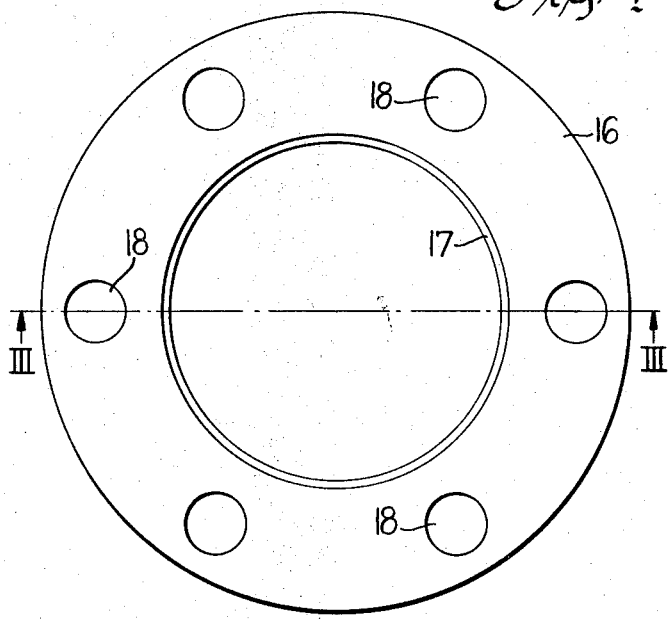
Fig. 2
Fig. 3
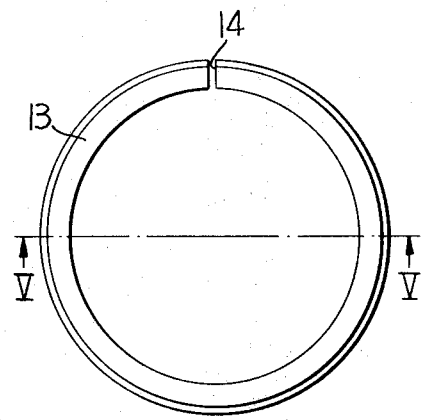
Fig. 4
Fig. 5
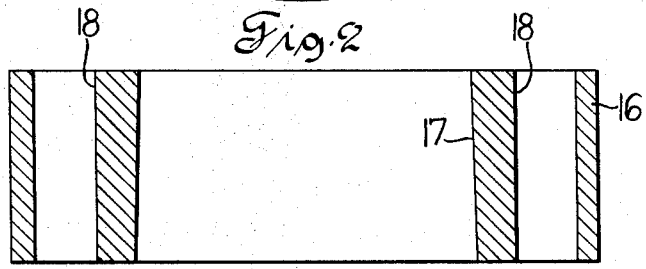
Inventor
Thomas R. Callahan
By John O. Hines
Attorney United States Patent Office 3,531,216
Patented Sept. 29, 1970

3,531,216
SHAFT ATTACHING MEANS FOR PUMP IMPELLER
Thomas R. Callahan, Milford, Ohio, assignor to Allis-Chalmers Manufacturing Company, Milwaukee, Wis.
Filed Dec. 23, 1968, Ser. No. 786,204
Int. Cl. B60b 27/06; F04d 1/00, 29/26
U.S. Cl. 416—244                    2 Claims

ABSTRACT OF THE DISCLOSURE

The pump impeller is keyed to the shaft in the conventional manner to transmit rotary motion. An axially split ring is slipped over the shaft and abuts against the impeller hub. The outer surface of the ring has an axial taper. An outer ring slips over the inner ring and is bolted to the impeller hub. As the outer ring is pulled toward the impeller hub, it causes a binding engagement with the outer taper of the inner ring forcing the split ring into tight engagement with the shaft.

---

This invention pertains in general to pumps, and more particularly to a means for attaching a pump impeller to a rotating shaft.

Although it is not intended to so limit this invention it was developed for use in connection with multistage turbine pumps.

One prior art method of attachment of a turbine pump impeller to a shaft requires a taper bore in the impeller hub. The impeller is held to the pump shaft by driving a slotted tapered bushing into the bore of the impeller about the pump shaft. With this arrangement the bushing is subjected to both torsional and thrust loads since there is no conventional key connection between the shaft and the impeller. This arrangement is usually limited to relatively small size pumps.

Another means of attachment used in the prior art, includes the well-known key connection to the shaft which transmits torsional loads to the impeller. However, the thrust load is taken by a split ring which is located in an annular groove in the pump shaft. Bolts generally extend through the ring and hold the impeller hub to the ring. In this arrangement tolerances must be held to very close limits. Furthermore, because of the annular groove cut into the shaft the effective diameter of the shaft is reduced and creates a stress concentration area in the shaft.

It is the intention and general object of this invention to provide a means for attaching an impeller to a pump shaft which overcomes the shortcomings set forth above in regard to the above-mentioned prior art means of attachment.

A more specific object of the subject invention is to provide a shaft attachment for a pump impeller wherein the torsional load is transmitted by a conventional shaft key and the axial thrust is transmitted by tapered rings bolted to the impeller hub.

These and other objects of the subject invention will become more fully apparent as the following description is read in light of the attached drawing wherein:

FIG. 1 is a partial cross section taken through a multistage turbine pump showing the pump impeller attached to the shaft in accordance with the invention;

FIG. 2 is a plan view of the outer thrust ring;

FIG. 3 is a cross section taken along the lines III—III of FIG. 2;

FIG. 4 is a plan view of the inner thrust ring; and

FIG. 5 is a cross section taken along the lines V—V of FIG. 4.

Referring to the drawings the invention is described in connection with a multistage turbine pump having a pump casing generally designated 6. A pump shaft 7 is rotatably supported in the pump in any conventional manner such as by antifriction bearings (not shown). A pump impeller 8 with a hub 9 having a straight shaft bore 11 therethrough is located on the shaft 7. The shaft 7 and hub 11 have conventional keyway slots therein in which is received a shaft key 12. This keyway connection in the normal manner transmits torsional force between the shaft and the pump impeller.

An inner ring 13 having a straight through bore of a diameter substantially the same as or slightly less than the diameter of the shaft is provided about the shaft with its end abutting the surface of the impeller hub 9. The outer surface of the inner ring 13 is preferably provided with a taper and an axial slot 14 is cut through the wall on one side of the ring.

An outer thrust ring or collar 16 having a tapered bore 17 therethrough fits over the outer surface of the inner ring 13. Although it is preferred that the bore 17 of the outer ring 16 be tapered this is not absolutely necessary. The invention could be practiced with a single taper on either the bore 17 or the outside diameter of the inner ring 13. The outer ring 17 is provided with a plurality of circumferentially space axially directed through holes 18. These holes 18 align with internally threaded bores 19 in the impeller hub 9.

Bolts 21 are provided through the holes 18 in the outer ring and are threadably received into the bores 19 in the impeller hub. As the bolts 21 are tightened the outer ring 16 is drawn up on the inner ring 13. The walls of the inner ring are permitted to deflect into engagement with the shaft 7 because of the slot 14 cut through one side of the inner ring. Binding force between the connected elements forms a rigid assembly including the impeller onto the shaft 7. The magnitude of the binding force is dependent on the coefficient of friction between the inner ring and the shaft, the taper between the inner and outer rings plus the size and type of bolts used.

From the above description, it can be seen that a very simplified attachment for an impeller to a shaft has been provided. With this arrangement the only machining of the shaft is in the form of a conventional keyway and the annular slot which materially weakens the shaft is not required. Furthermore, the attachment through the inner and outer taper rings 13 and 16 transmits only axial thrust. An additional advantage is that the impeller 9 may be removed from the shaft without breaking the binding connection between the tapered surfaces on the rings 13 and 16.

Although only one embodiment of the subject invention has been herein shown and described other embodiments will be apparent to those skilled in the art after reading this description and it is intended that all such embodiments as come within a reasonable interpretation of the appended claims be covered.

The embodiments of the invention in which an exclusive property or privilege is claimed are defined as follows:

1. An attachment for transmitting both rotational and axial thrust between a pump impeller having a hub and a rotatable shaft comprising: walls defining a shaft bore in said impeller hub, said impeller positioned on said shaft; a keyway connection directly between said impeller hub and said shaft to transmit rotational thrust therebetween; an inner axially split ring positioned about said shaft in axially abutting engagement with said impeller hub; an outer ring positioned about said inner ring for interfering engagement therewith, one of said rings having an axially tapered surface to provide said interfering engagement; and attachment means connecting said outer ring to said impeller hub, said attachment means drawing said outer ring into said interfering engagement with said inner ring and forcing said inner split ring into tight holding engagement with said shaft to transmit axial thrust therebetween.

2. The attachment set forth in claim 1 wherein said inner ring has an axial taper on its outer diameter and said outer ring has an axially tapered bore.

References Cited

UNITED STATES PATENTS

| | | | |
|---|---|---|---|
| 2,669,471 | 2/1954 | Breslow | 287—52.06 |
| 2,787,483 | 4/1957 | Harvey et al. | 287—52.06 |
| 2,890,071 | 6/1959 | Johnson | 287—52.06 |
| 3,021,049 | 2/1962 | Settle | 230—134 |

HENRY F. RADUAZO, Primary Examiner

U.S. Cl. X.R.

287—52.04